United States Patent Office.

JOHN W. SMITH, OF WASHINGTON, DISTRICT OF COLUMBIA, ASSIGNOR TO HIMSELF AND JOHN J. SULIVAN.

Letters Patent No. 94,785, dated September 14, 1869; antedated July 31, 1869.

IMPROVED COMPOSITION FOR PAVING.

The Schedule referred to in these Letters Patent and making part of the same.

*To all whom it may concern:*

Be it known that I, JOHN W. SMITH, of the city of Washington, District of Columbia, have invented a new and improved Composition for Making a Hard and Inodorous Compound for paving streets, sidewalks, stable-floors, and cellars, and rendering the same water-proof; and I do hereby declare that the following is a full description thereof.

The nature of my invention consists in combining with coal-tar or pitch a composition by which the same may be rendered hard and inodorous, which coal-tar or pitch thus treated may be used, in combination with other materials, in making a hard, durable, and inodorous concrete for paving side-walks, streets, stable-floors, and cellars, and rendering the same water-proof.

To enable others skilled in the art to make and use my invention, I will proceed to describe the mode of combining and making the same.

The composition I use to render the coal-tar or pitch hard and inodorous, I make by combining and mixing together four parts of sulphuric acid, two parts of nitric acid, and one part of muriatic acid.

This composition I stir and mix into the coal-tar while boiling in an iron kettle, in the proportion of one and a half pints to one barrel of the pitch or tar.

When the acid ceases to act upon the tar, I then add one gill of carbonate of soda, to neutralize the acid in the mixture.

When the effervesence ceases, I add the following mixture:

Take four parts each of finely-pulverized dry clay, gravel, and sand, and one part of water-lime, and mix well together dry.

Stir this mixture into the prepared tar or pitch till it is of the proper consistency to spread for pavement without running; then spread where wanted, either cold or hot.

After it is spread, sprinkle thickly with sand, and roll it.

What I claim as my invention, and desire to secure by Letters Patent, is—

The combining with coal-tar or pitch the deodorizing and hardening-compound above described, composed of sulphuric, nitric, and muriatic acids, of the proportions above named; and also the combining with the coal-tar or pitch, thus prepared, the compound of clay, gravel, sand, and water-lime, of the proportions above named and described, using said mixture in making concrete, for the purposes above named and specified.

In testimony that I claim the foregoing as my own, I affix my signature in presence of two witnesses.

J. W. SMITH.

Witnesses:
    A. S. WORTH,
    J. V WHITE.